United States Patent
Ong et al.

(10) Patent No.: US 12,316,637 B2
(45) Date of Patent: May 27, 2025

(54) NETWORK FILTER

(71) Applicant: Comcast Cable Communications, LLC, Philadelphia, PA (US)

(72) Inventors: Ivan Ong, Malvern, PA (US); Clifton Lowery, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 218 days.

(21) Appl. No.: 17/956,391

(22) Filed: Sep. 29, 2022

(65) Prior Publication Data

US 2023/0103015 A1    Mar. 30, 2023

Related U.S. Application Data

(63) Continuation of application No. 16/858,296, filed on Apr. 24, 2020, now Pat. No. 11,489,837, which is a continuation of application No. 14/151,477, filed on Jan. 9, 2014, now Pat. No. 10,681,142.

(51) Int. Cl.
  *H04L 9/40* (2022.01)
  *H04L 67/141* (2022.01)
  *H04W 12/08* (2021.01)
  *H04W 12/088* (2021.01)

(52) U.S. Cl.
  CPC ........... *H04L 63/101* (2013.01); *H04L 63/10* (2013.01); *H04L 67/141* (2013.01); *H04W 12/08* (2013.01); *H04W 12/088* (2021.01)

(58) Field of Classification Search
  CPC .............. H04L 63/10–108; H04W 76/00–50
  See application file for complete search history.

(56) References Cited

U.S. PATENT DOCUMENTS

| | | | |
|---|---|---|---|
| 7,499,438 B2* | 3/2009 | Hinman | H04W 72/51 370/338 |
| 7,551,574 B1 | 6/2009 | Peden, II et al. | |
| RE41,168 E | 3/2010 | Shannon | |
| 7,986,938 B1 | 7/2011 | Meenan et al. | |
| 9,088,386 B2 | 7/2015 | Brisebois et al. | |
| 9,282,460 B2* | 3/2016 | Souissi | H04W 12/088 |
| 9,723,637 B2* | 8/2017 | De La Forest Divonne | H04W 12/122 |
| 10,129,751 B2* | 11/2018 | Singh | H04W 12/084 |
| 2003/0046397 A1 | 3/2003 | Trace et al. | |

(Continued)

FOREIGN PATENT DOCUMENTS

| | | |
|---|---|---|
| EP | 2894830 A1 | 7/2015 |
| EP | 3226592 A1 | 10/2017 |
| WO | 2012166671 A1 | 12/2012 |

OTHER PUBLICATIONS

Cisco, "802.11 Association Process Explained" (2013) (3 pages).

(Continued)

*Primary Examiner* — Brendan Y Higa
(74) *Attorney, Agent, or Firm* — Ballard Spahr LLP (57) ABSTRACT

Systems and methods for managing a network are disclosed. One method can comprise transmitting a first identifier associated with a first service. Access to the first service can be provided to a user device using the first identifier. A filter element associated with the user device can be received. Transmission of a second identifier associated with a second service can be filtered based on the filter element, wherein filtering transmission inhibits access of the user device to the second service.

20 Claims, 7 Drawing Sheets

(56) References Cited

U.S. PATENT DOCUMENTS

| | | |
|---|---|---|
| 2003/0074422 A1 | 4/2003 | Montemurro et al. |
| 2004/0214572 A1 | 10/2004 | Thompson et al. |
| 2006/0153122 A1* | 7/2006 | Hinman .................. H04L 67/04 |
| | | 370/328 |
| 2008/0316983 A1 | 12/2008 | Daigle |
| 2009/0293106 A1 | 11/2009 | Gray et al. |
| 2010/0107225 A1 | 4/2010 | Spencer et al. |
| 2010/0146614 A1* | 6/2010 | Savoor .................. H04L 9/3263 |
| | | 726/10 |
| 2011/0086614 A1 | 4/2011 | Brisebois et al. |
| 2012/0204236 A1 | 8/2012 | Chen et al. |
| 2013/0174239 A1 | 7/2013 | Kim et al. |
| 2013/0305320 A1 | 11/2013 | Warrick et al. |
| 2013/0333016 A1* | 12/2013 | Coughlin .............. H04L 63/083 |
| | | 709/227 |
| 2013/0347073 A1 | 12/2013 | Bryksa et al. |
| 2014/0068705 A1 | 3/2014 | Chambers et al. |
| 2014/0126356 A1 | 5/2014 | Lee et al. |
| 2014/0164616 A1 | 6/2014 | Pinto et al. |
| 2014/0171078 A1 | 6/2014 | Ryerson |
| 2014/0235205 A1 | 8/2014 | Paluch et al. |
| 2014/0370852 A1 | 12/2014 | Wohlert et al. |
| 2014/0376370 A1* | 12/2014 | Cioffi .................. H04L 12/2854 |
| | | 370/230 |
| 2015/0006695 A1 | 1/2015 | Gupta |
| 2015/0063329 A1 | 3/2015 | Frye et al. |
| 2015/0245278 A1* | 8/2015 | Scahill ................ H04W 12/086 |
| | | 370/329 |
| 2015/0327052 A1 | 11/2015 | Ghai |
| 2016/0044036 A1 | 2/2016 | Bestermann |
| 2016/0088026 A1 | 3/2016 | Mohamad Abdul et al. |
| 2016/0241452 A1* | 8/2016 | Ringland ................ H04L 45/24 |
| 2016/0373925 A1 | 12/2016 | Li et al. |
| 2017/0290074 A1 | 10/2017 | Lee |
| 2018/0262964 A1 | 9/2018 | Igawa |

OTHER PUBLICATIONS

European Search Report and Written Opinion issued on Aug. 9, 2017 by the European Patent Office for EP Application No. 17164152. 5, which was filed on Mar. 31, 2017 and published as EP 3226592 A1 on Oct. 4, 2017 (Applicant—Comcast Cable Communications, LLC) (12 pages).

European Search Report issued on Jun. 6, 2015 by the European Patent Office for European Patent Application No. 15150669.8, which was filed on Jan. 9, 2015 and published as 2894830 on Jul. 15, 2015 (Inventor—Ong; Applicant—Comcast Corp. (5 pages).

Canadian Office Action issued in related application No. CA 2,877,359 mailed Mar. 10, 2021.

European Office Action issued in related EP Application No. 17164152.5 mailed Aug. 26, 2021.

* cited by examiner

NETWORK FILTER

CROSS-REFERENCE TO RELATED PATENT APPLICATION

This application is a continuation of U.S. application Ser. No. 16/858,296, filed Apr. 24, 2020, which is a continuation of U.S. application Ser. No. 14/151,477, filed Jan. 9, 2014, which are incorporated herein by reference in their entirety.

BACKGROUND

A network, such as a local area network, can comprise one or more network devices such as access points (AP) to provide a means for one or more user devices to communicate with and/or over the network. A network device can comprise a device that allows wired and/or wireless user devices to connect to a wired network using Wi-Fi, Bluetooth, or related standards. A network device can be configured to provide access to one or more services (e.g., network-related services). Often a user device can experience conflicts when trying to selectively connect to one available service over another service. Such conflicts can require a user to manually configure the user device for selective access to one or more services. Accordingly, improvements are needed for mediating devices connected to a network. These and other shortcomings are addressed by the present disclosure.

SUMMARY

It is to be understood that both the following general description and the following detailed description are exemplary and explanatory only and are not restrictive, as claimed. Provided are methods and systems for providing services (e.g., network connectivity, broadband services, etc.) to one or more user devices or clients. The methods and systems described herein, in one aspect, can filter access to one or more services by one or more user devices or clients.

In an aspect, methods can comprise transmitting a first identifier associated with a first service. Access to the first service can be provided to a user device using the first identifier. A filter element associated with the user device can be received. Transmission of a second identifier associated with a second service can be filtered based on the filter element, wherein filtering the transmission inhibits access of the user device to the second service.

In another aspect, methods can comprise providing access to a first network and providing access to a second network. An identifier associated with a user device can be received. Access of the user device to one or more of the first network and the second network can be filtered using the identifier.

In a further aspect, methods can comprise receiving an access request from a user device, wherein the user device is associated with an identifier. A filter element can be received. The filter element can relate to the identifier. Access by the user device to a network can be filtered using the filter element.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded on a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The methods and systems described herein, in one aspect, can provide services (e.g., network connectivity, broadband services, etc.) to one or more user devices or clients. The methods and systems described herein, in one aspect, can filter access by one or more user devices or clients to one or more services. In another aspect, filtering access can be dependent upon a location of the user device.

Figure 1:
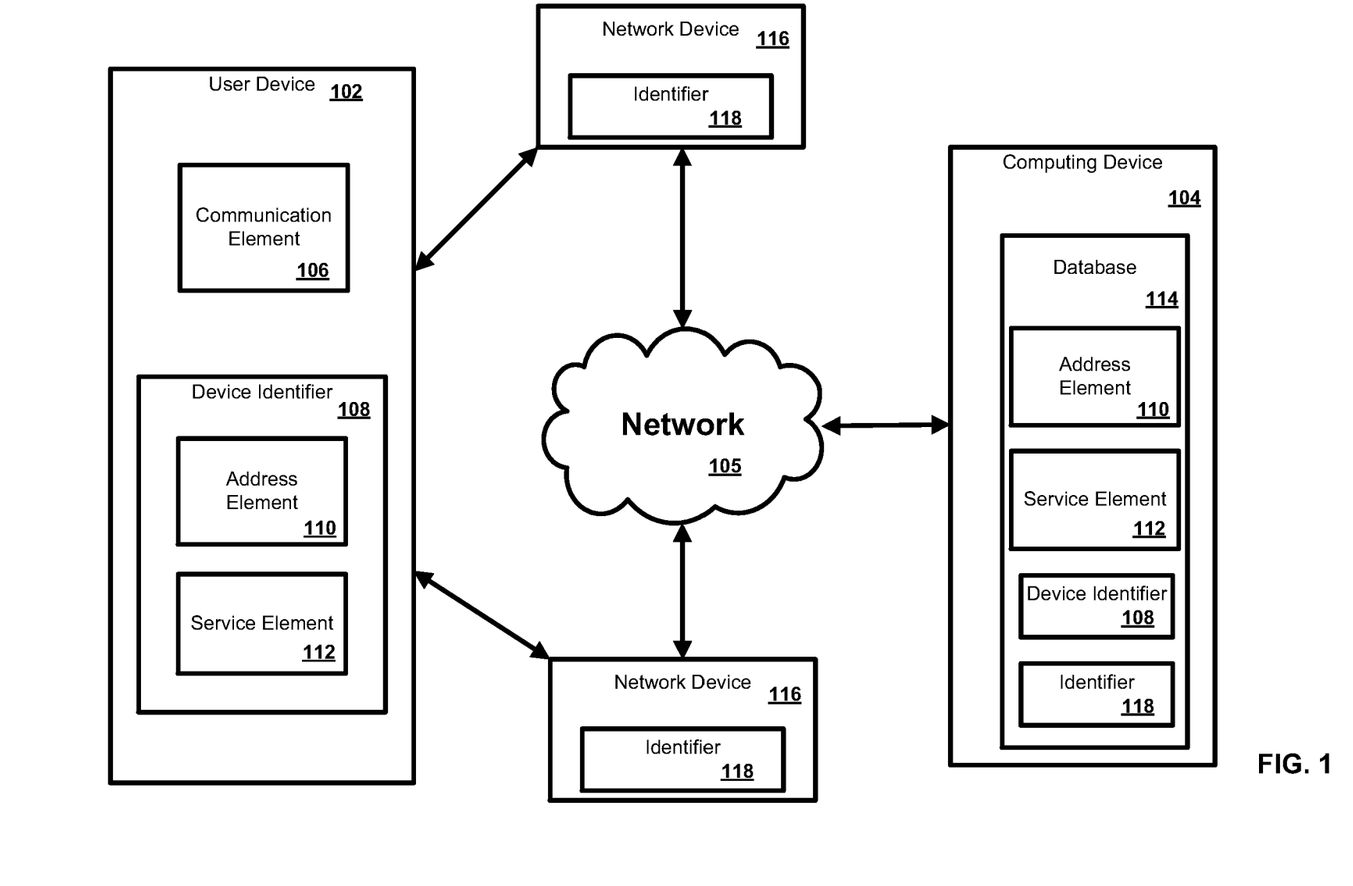
FIG. 1 is a block diagram of an exemplary system and network.

In one aspect of the disclosure, a system can be configured to provide services such as network-related services. FIG. 1 illustrates various aspects of an exemplary environment in which the present methods and systems can operate. The present disclosure is relevant to systems and methods for providing services to a user device, for example. Those skilled in the art will appreciate that present methods may be used in various types of networks and systems that employ both digital and analog equipment. One skilled in the art will appreciate that provided herein is a functional description and that the respective functions can be performed by software, hardware, or a combination of software and hardware.

The network and system can comprise a user device 102 in communication with a computing device 104, such as a server, for example. The computing device 104 can be disposed locally or remotely relative to the user device 102. As an example, the user device 102 and the computing device 104 can be in communication via a private and/or public network 105, such as the Internet. Other forms of communications can be used, such as wired and wireless telecommunication channels, for example.

In an aspect, the user device 102 can be an electronic device, such as a computer, a smartphone, a laptop, a tablet, a set top box, a display device, or other device capable of communicating with the computing device 104. As an example, the user device 102 can comprise a communication element 106 for providing an interface to a user to interact with the user device 102 and/or the computing device 104. The communication element 106 can be any interface for presenting information to the user and receiving a user feedback, such as an application client or a web browser (e.g., Internet Explorer, Mozilla Firefox, Google Chrome, Safari, or the like). Other software, hardware, and/or interfaces can be used to provide communication between the user and one or more of the user device 102 and the computing device 104. As an example, the communication element 106 can request or query various files from a local source and/or a remote source. As a further example, the communication element 106 can transmit data to a local or remote device, such as the computing device 104.

In an aspect, the user device 102 can be associated with a user identifier or device identifier 108. As an example, the device identifier 108 can be any identifier, token, character, string, or the like, for differentiating one user or user device (e.g., user device 102) from another user or user device. In a further aspect, the device identifier 108 can identify a user or user device as belonging to a particular class of users or user devices. As a further example, the device identifier 108 can comprise information relating to the user device, such as a manufacturer, a model or type of device, a service provider associated with the user device 102, a state of the user device 102, a locator, and/or a label or classifier. Other information can be represented by the device identifier 108.

In an aspect, the device identifier 108 can comprise an address element 110 and a service element 112. In an aspect, the address element 110 can be an internet protocol address, a MAC address, a network address, an Internet address, or the like. As an example, the address element 110 can be relied upon to establish a communication session between the user device 102 and the computing device 104 or other devices and/or networks. As a further example, the address element 110 can be used as an identifier or locator of the user device 102. In an aspect, the address element 110 can be persistent for a particular network and/or location.

In an aspect, the service element 112 can comprise an identification of a service provider associated with the user device 102 and/or with the class of user device 102. As an example, the service element 112 can comprise information relating to or provided by a communication service provider (e.g., Internet service provider) that is providing or enabling communication services to the user device 102. As a further example, the service element 112 can comprise information relating to a preferred service provider for one or more particular services relating to the user device 102. In an aspect, the address element 110 can be used to identify or retrieve the service element 112, or vise versa. As a further example, one or more of the address element 110 and the service element 112 can be stored remotely from the user device 102 and retrieved by one or more devices, such as the user device 102 and the computing device 104. Other information can be represented by the service element 112.

In an aspect, the computing device 104 can be a server for communicating with the user device 102. As an example, the computing device 104 can communicate with the user device 102 for providing services. In an aspect, the computing device 104 can allow the user device 102 to interact with remote resources, such as data, devices, and files. As an example, the computing device can be configured as central location (e.g., a headend, or processing facility), which can receive content (e.g., data, input programming) from multiple sources. The computing device 104 can combine the content from the various sources and can distribute the content to user (e.g., subscriber) locations via a distribution system.

In an aspect, the computing device 104 can manage the communication between the user device 102 and a database 114 for sending and receiving data therebetween. As an example, the database 114 can store a plurality of files (e.g., templates, MAC filter templates, user identifiers (e.g., device identifier 108) or records, device identifiers (e.g., identifier 118), or other information. As a further example, the user device 102 can request and/or retrieve a file from the database 114. In an aspect, the database 114 can store information relating to the user device 102, such as the address element 110 and/or the service element 112. As an example, the computing device 104 can obtain the device identifier 108 from the user device 102 and retrieve information from the database 114, such as the address element 110 and/or the service elements 112. As a further example, the computing device 104 can obtain the address element 110 from the user device 102 and can retrieve the service element 112 from the database 114, or vice versa. Any information can be stored in and retrieved from the database 114. The database 114 can be disposed remotely from the computing device 104 and accessed via direct or indirect connection. The database 114 can be integrated with the computing system 104 or some other device or system.

In an aspect, one or more of the one or more of the network devices 116 can be in communication with a network, such as network 105. As an example, one or more of the network devices 116 can facilitate the connection of a device, such as the user device 102, to the network 105. As a further example, one or more of the network devices 116 can be configured as a network gateway. In an aspect, one or more of the network devices 116 can be configured to allow one or more wireless devices to connect to a wired and/or wireless network using Wi-Fi, Bluetooth or similar standard.

In an aspect, the network devices 116 can be configured as a mesh network. As an example, one or more of the network devices 116 can comprise a dual band wireless network device. As such, a single one of the network devices 116 can provided access to multiple networks. As an example, the network devices 116 can be configured with a first service set identifier (SSID) (e.g., associated with a user network or private network) to function as a local network for a particular user or users. As another example, the network devices 116 can be configured with a second service set identifier (SSID) (e.g., associated with a public/community network or a hidden network) to function as a secondary network or redundant network for connected communication devices. As a further example, a single network device 116 (e.g., gateway) can be configured to operate as an access point to a primary (e.g., private) network and a secondary (e.g., public) network.

In an aspect, one or more of the network devices 116 can comprise an identifier 118. As an example, one or more identifiers can be a media access control address (MAC address). As a further example, one or more identifiers 118 can be a unique identifier for facilitating communications on the physical network segment. In an aspect, each of the network devices 116 can comprise a distinct identifier 118. As an example, the identifiers 118 can be associated with a physical location of the network devices 116.

In an aspect, the user device 102 can provide information such as identification information (e.g., device identifier 108, credentials, etc.) to one or more of the network devices 116. As an example, the user device 102 can request a service such as connectivity to a network by providing information to the network device 116. In another aspect, the network device 116 can transmit the information received from the user device 102 to the computing device. As an example, the network device 116 can invoke a lookup algorithm to locate a record associated with the information provided by the user device 102. As a further example, the record can be located in service provider database (e.g., database 114). In a further aspect, the information provided by the user device 102 may be associated with an identifier (e.g., identifier 118) of the network device 116. As an example, a database record can comprise a mapping of a device identifier (e.g., device identifier 108) and an identifier (e.g., identifier 118) associated with the network device 116. In an aspect, the database record can be inserted into a filter list template, for example, by the computing device 104. The computing device 104 can transmit the filter list template to the network device 116. In another aspect, the network device 116 can be initialized (e.g., rebooted, forced reboot during off-peak times). The network device 116 can blacklist the user device 102 from accessing one or more services provided via the network device 116. For example, the network device 116 can use the filter list template to block access to one or more signals associated with a particular SSID. As another example, the network device 116 can allow access to a home SSID, but block access to other SSID's transmitted via the network device 116. Such operation can ensure the user device 102 is receiving the service that it had subscribed to and that traffic is segregated accordingly for optimal service. Such operation can be repeated for one or more devices associated with the network device 116. When the user device 102 connects to a network device that does not have the filter information (e.g., filter list template), the user device can access the service. As an example, the user device 102 may be blocked from accessing a public Wi-Fi network while inside a premises, whereas the user device 102 can be permitted to access the public Wi-Fi network while outside the premises. Geo location information relating to the user device 102 can be used, but is not required to block/allow the user device 102 to connect to one or more networks. Such selective connectivity can be based on whether the network has the filter list template for blocking the user device 102 on a particular network.

Figure 2:
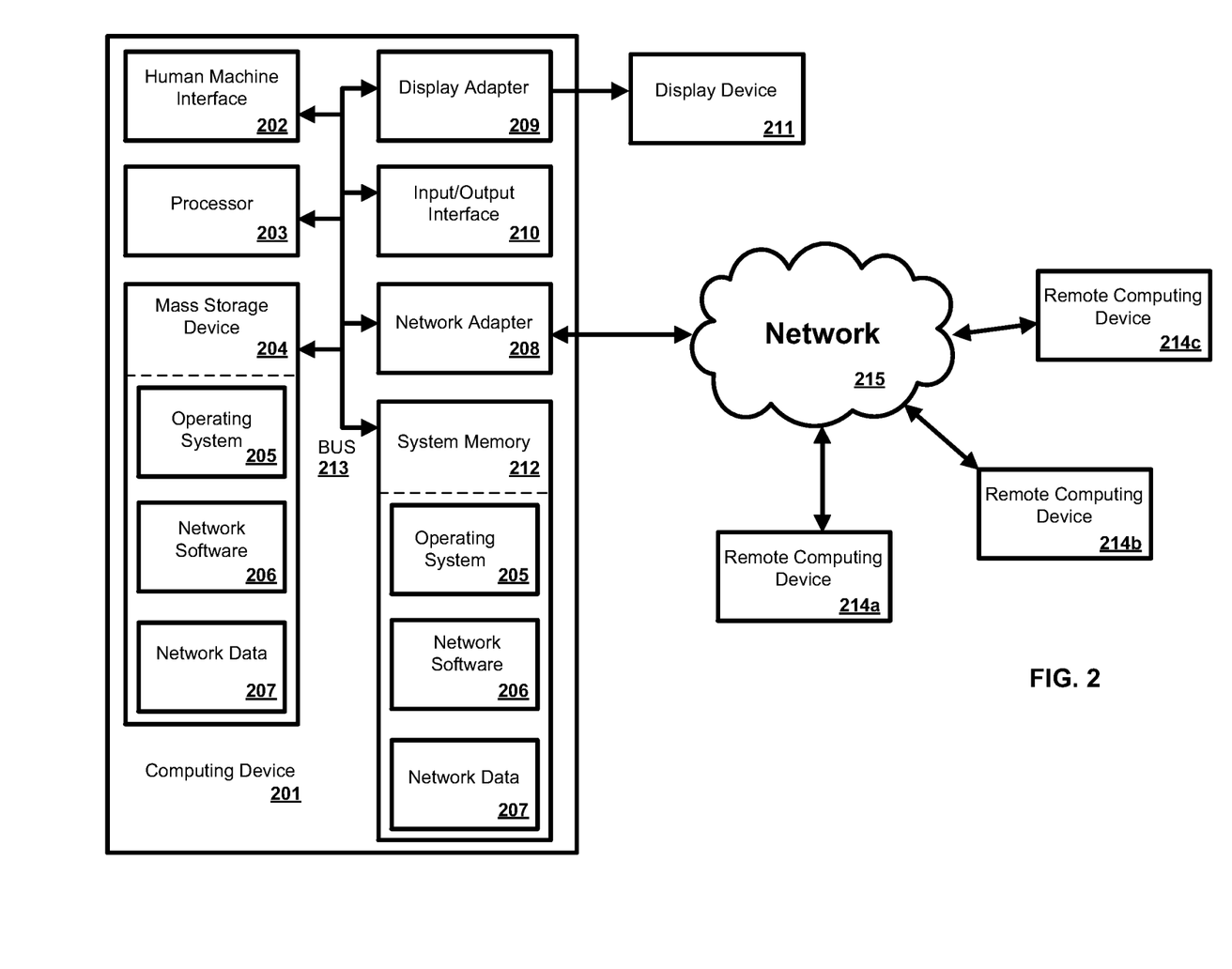
FIG. 2 is a block diagram of an exemplary computing device.

In an exemplary aspect, the methods and systems can be implemented on a computing system, such as computing device 201 as illustrated in FIG. 2 and described below. By way of example, one or more of the user device 102 and the computing device 104 of FIG. 1 can be a computing device as illustrated in FIG. 2. Similarly, the methods and systems disclosed can utilize one or more computing devices to perform one or more functions in one or more locations. FIG. 2 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computing device 201. The components of the computing device 201 can comprise, but are not limited to, one or more processors or processing units 203, a system memory 212, and a system bus 213 that couples various system components including the processor 203 to the system memory 212. In the case of multiple processors 203, the system can utilize parallel computing.

The system bus 213 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 213, and all buses specified in this description can also be implemented over a wired or wireless network connection and each of the subsystems, including the processor 203, a mass storage device 204, an operating system 205, network software 206, network data 207, a network adapter 208, system memory 212, an Input/Output Interface 210, a display adapter 209, a display device 211, and a human machine interface 202, can be contained within one or more remote computing devices 214a,b,c at physically separate locations, connected through buses of this form, in effect implementing a fully distributed system.

The computing device 201 typically comprises a variety of computer readable media. Exemplary readable media can be any available media that is accessible by the computing device 201 and comprises, for example and not meant to be limiting, both volatile and non-volatile media, removable and non-removable media. The system memory 212 comprises computer readable media in the form of volatile memory, such as random access memory (RAM), and/or non-volatile memory, such as read only memory (ROM). The system memory 212 typically contains data, such as network data 207 and/or program modules, such as operating system 205 and network software 206 that are immediately accessible to and/or are presently operated on by the processor 203.

In another aspect, the computing device 201 can also comprise other removable/non-removable, volatile/non-volatile computer storage media. By way of example, FIG. 2 illustrates a mass storage device 204 which can provide non-volatile storage of computer code, computer readable instructions, data structures, program modules, and other data for the computing device 201. For example and not meant to be limiting, a mass storage device 204 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 204, including by way of example, an operating system 205 and network software 206. Each of the operating system 205 and network software 206 (or some combination thereof) can comprise elements of the programming and the network software 206. Network data 207 can also be stored on the mass storage device 204. Network data 207 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computing device 201 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processor 203 via a human machine interface 202 that is coupled to the system bus 213, but can be connected by other interface and bus structures, such as a parallel port, game port, an IEEE 1394 Port (also known as a Firewire port), a serial port, or a universal serial bus (USB).

In yet another aspect, a display device 211 can also be connected to the system bus 213 via an interface, such as a display adapter 209. It is contemplated that the computing device 201 can have more than one display adapter 209 and the computer 201 can have more than one display device 211. For example, a display device can be a monitor, an LCD (Liquid Crystal Display), or a projector. In addition to the display device 211, other output peripheral devices can comprise components, such as speakers (not shown) and a printer (not shown) which can be connected to the computing device 201 via the Input/Output Interface 210. Any step and/or result of the methods can be output in any form to an output device. Such output can be any form of visual representation, including, but not limited to, textual, graphical, animation, audio, tactile, and the like. The display 211 and computing device 201 can be part of one device, or separate devices.

The computing device 201 can operate in a networked environment using logical connections to one or more remote computing devices 214a,b,c. By way of example, a remote computing device can be a personal computer, portable computer, a smart phone, a server, a router, a network computer, a peer device or other common network node, and so on. Logical connections between the computing device 201 and a remote computing device 214a,b,c can be made via a network 215, such as a local area network (LAN) and a general wide area network (WAN). Such network connections can be through a network adapter 208. A network adapter 208 can be implemented in both wired and wireless environments. Such networking environments are conventional and commonplace in dwellings, offices, enterprise-wide computer networks, intranets, and the Internet.

For purposes of illustration, application programs and other executable program components, such as the operating system 205, are illustrated herein as discrete blocks, although it is recognized that such programs and components reside at various times in different storage components of the computing device 201, and are executed by the data processor(s) of the computer. An implementation of network software 206 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information, such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence techniques, such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. expert inference rules generated through a neural network or production rules from statistical learning).

Figure 3:
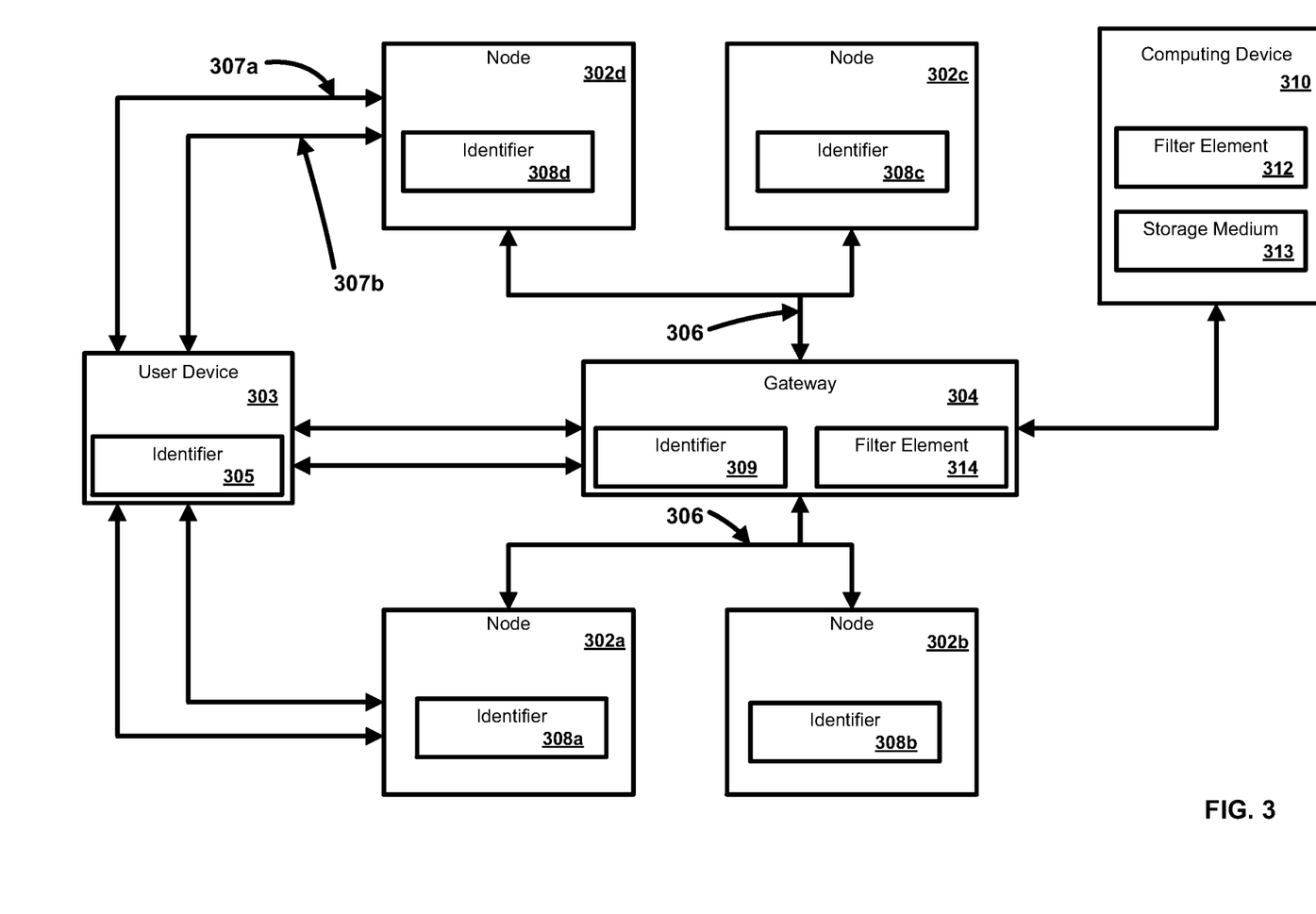
FIG. 3 is a diagram of an exemplary system and network.

FIG. 3 illustrates an exemplary system and network. In an aspect, a plurality of nodes 302a, 302b, 302c, 302d can be in communication with one or more user devices 303 and a gateway 304. As an example, one or more nodes 302a, 302b, 302c, 302d can be a network device, router, switch, communication device, or the like. As another example, one or more user devices 303 can be an electronic device, such as a computer, a smartphone, a laptop, a tablet, a set top box, a display device, or other device capable of communicating with one or more of the nodes 302a, 302b, 302c, 302d of the network.

In an aspect, the user device 303 can be associated with a user identifier or device identifier 305. As an example, the device identifier 305 can be any identifier, token, character, string, or the like, for differentiating one user or user device (e.g., user device 303) from another user or user device. In a further aspect, the device identifier 305 can identify a user or user device as belonging to a particular class of users or user devices. As a further example, the device identifier 305 can comprise information relating to the user device, such as a manufacturer, a model or type of device, a service provider associated with the user device 303, a state of the user device 303, a locator, and/or a label or classifier. Other information can be represented by the device identifier 305. In an aspect, the identifier 305 can be an internet protocol address, a MAC address, a network address, an Internet address, or the like. As an example, the identifier 305 can be relied upon to establish a communication session between the user device 303 and the computing device 304 or other devices (e.g., nodes 302a, 302b, 302c, 302d) and/or networks. As a further example, the identifier 305 can be used as an identifier or locator of the user device 303. In an aspect, the identifier 305 can be persistent for a particular network and/or location.

In an aspect, one or more of the nodes 302a, 302b, 302c, 302d can be configured to communicate with another of the nodes 302a, 302b, 302c, 302d and/or the gateway 304 via one or more communication paths 306. In an aspect, the one or more communication paths 306 can comprise one or more uninterrupted communication links, sequential links, predefined paths or links, and/or intervening nodes. Links can comprise a single point to point connection between two devices or network devices. Paths can comprise one or more links. As an example, one or more of the communication paths can comprise one or more of the nodes 302a, 302b, 302c, 302d. As a further example, one or more of the nodes 302a, 302b, 302c, 302d can be configured as a mesh network. In an aspect, one or more of the communication paths 306 can be configured to transmit one or more services.

In an aspect, the nodes 302a, 302b, 302c, 302d can be configured as a network, such as a mesh network. As an example, the gateway 304 and/or one or more nodes 302a, 302b, 302c, 302d can comprise a dual band wireless network device. As an example, a first service 307a or network can be provided. The first service 307a can be configured with a first service set identifier (SSID) (e.g., associated with a user network or private network) to function as a local network for a particular user or users. As a further example, a second service 307b or network can be provided. The second service 307b can be configured with a second service set identifier (SSID) (e.g., associated with a public/community network or a hidden network) to function as a secondary network or redundant network for connected communication devices.

In an aspect, one or more of the nodes 302a, 302b, 302c, 302d can comprise an identifier 308a, 308b, 308c, 308d. As an example, one or more identifiers can be a media access control address (MAC address). Any uniquely identifiable attribute that can be linked to a location can be used as the identifier 308a, 308b, 308c, 308d. Such attributes can comprise one or more of an IP Address, serial number, latitude/ longitude, geo-encoding, custom assigned unique identifier, global unique identifier (GUID), and the like. As a further example, one or more identifiers 308a, 308b, 308c, 308d can be a unique identifier for facilitating communications on the physical network segment. In an aspect, each of the nodes 302a, 302b, 302c, 302d can comprise a distinct identifier 308a, 308b, 308c, 308d. As an example, the identifiers 308a, 308b, 308c, 308d can be associated with a physical location of the nodes 302a, 302b, 302c, 302d.

In an aspect, one or more nodes 302a, 302b, 302c, 302d can be in communication with the gateway 304. As an example, one or more nodes 302a, 302b, 302c, 302d and/or the gateway 304 can be configured to allow one or more wireless devices to connect to a wired and/or wireless network using Wi-Fi, Bluetooth or similar standard. The gateway 304 can comprise an identifier 309. As an example, one or more identifiers 309 can be a media access control address (MAC address). As a further example, one or more identifiers 309 can be a unique identifier for facilitating communications on the physical network segment.

In an aspect, a computing device 310 can be in communication with a network device, such as gateway 304. As an example, the computing device 310 can be or comprise an application server, management device, auto-configuration server (ACS), AAA server, etc. In another aspect, the computing device 310 is located within the second network, such as a wide area network (WAN).

In an aspect, the computing device 310 can manage the communication between the gateway 304 and a storage medium 313 for sending and receiving data therebetween. As an example, the storage medium 313 can store a plurality of files, such as filter elements 312 (e.g., templates, MAC filter templates, user identifiers (e.g., identifier 305) or records, device identifiers (e.g., identifier 309), or other information. As a further example, the gateway 304 can request and/or retrieve a file from the storage medium 313. In an aspect, the storage medium 313 can store information relating to the user device 303, the gateway 304, and/or a relationship between the user device 303 and the gateway 304. As an example, the computing device 310 can obtain the device identifier 305 from the gateway 304 and retrieve information from the storage medium 313, such as a mapping of the identifier 305 to the identifier 309. In an aspect, the computing device 310 can serve as a repository. As an example, the gateway 304 can transmit (e.g., push) one or more user device identifiers 305 and gateway identifiers 309 to the computing device 310. As a further example, the gateway 304 can contain a list (e.g., identifier, MAC address, hostname, etc.) of associated devices to a particular SSID. The computing device 310 can then store the list and link it (e.g., map it) to a filter template to ensure the gateway 304 receives the proper filter values. The storage medium 313 can be disposed remotely from the computing device 310 and accessed via direct or indirect connection. The storage medium 313 can be integrated with the computing device 310 or some other device or system.

Figure 4:
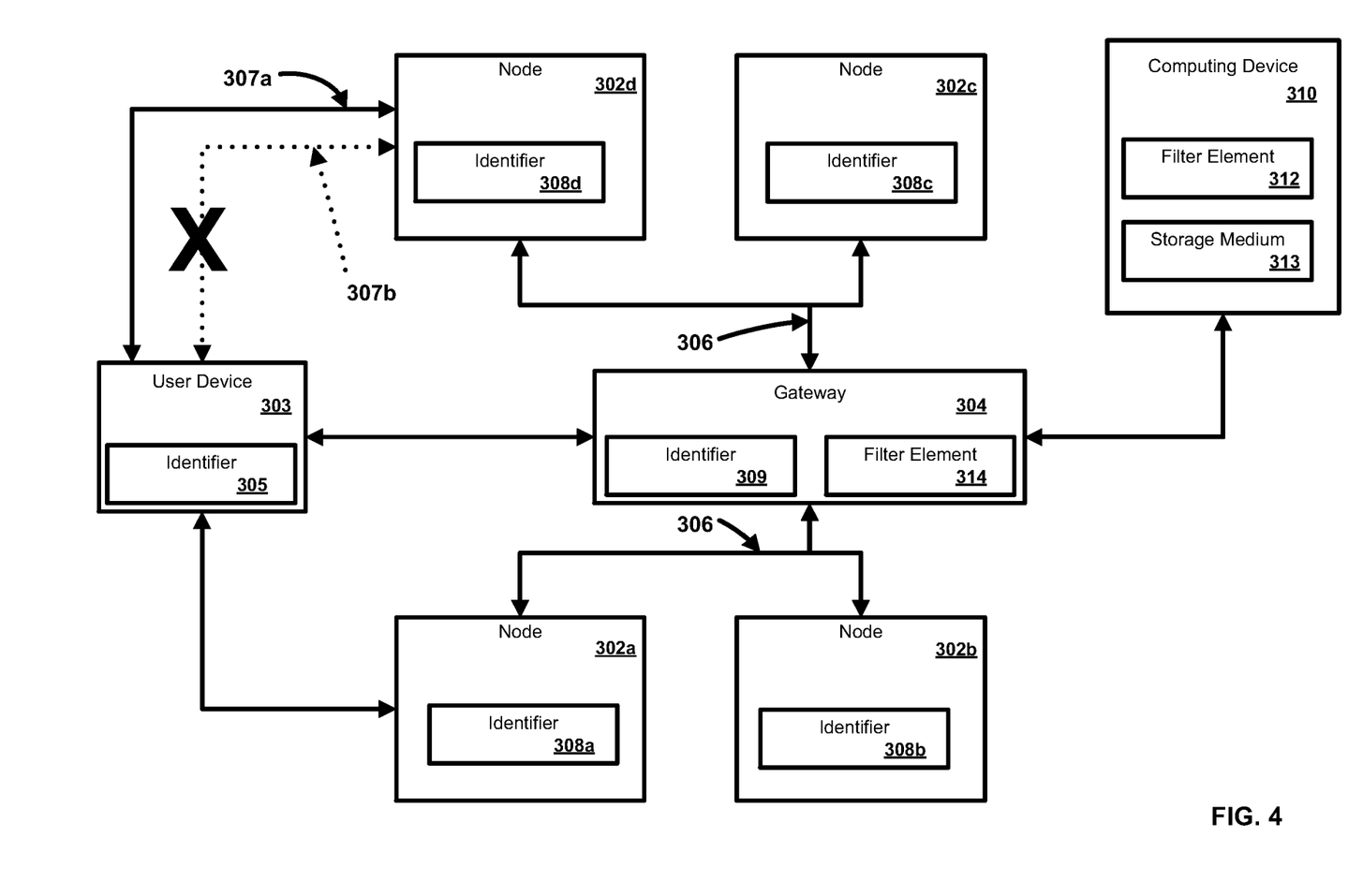
FIG. 4 is a diagram of an exemplary system and network.

In an aspect, a device such as the user device 303 can provide information, such as identification information (e.g., device identifier 108, credentials, etc.), to one or more nodes 302a, 302b, 302c, 302d. As an example, the user device 303 can request a service such as connectivity to a network by providing information to the nodes 302a, 302b, 302c, 302d and/or the gateway 304. In another aspect, the gateway 304 can transmit the information received from the user device 303 to the computing device 310. As an example, the gateway 304 and/or the computing device 310 can invoke a lookup algorithm to locate a record associated with the information provided by the user device 303. As a further example, the record can be located in a service provider database (e.g., storage medium 313). In a further aspect, the information provided by the user device 303 may be associated with an identifier of one or more nodes 302a, 302b, 302c, 302d and/or the gateway 304. As an example, a database record can comprise a mapping of a device identifier (e.g., device identifier 305) and an identifier (e.g., identifier 309) associated with the one or more nodes 302a, 302b, 302c, 302d and/or the gateway 304. In an aspect, the database record can be inserted into a filter list template (e.g., filter element 312), for example, by the computing device 310. The computing device 310 can transmit the template (e.g., filter element 312) to the one or more nodes 302a, 302b, 302c, 302d and/or the gateway 304. In another aspect, the one or more nodes 302a, 302b, 302c, 302d and/or the gateway 304 can be initialized (e.g., rebooted, forced reboot during off-peak times). The one or more nodes 302a, 302b, 302c, 302d and/or the gateway 304 can blacklist the user device 303 from accessing one or more services provided via the network device. For example, the one or more nodes 302a, 302b, 302c, 302d and/or the gateway 304 can use the template to block access to one or more signals associated with a particular SSID (e.g., service 307b), as illustrated in FIG. 4. As another example, the one or more nodes 302a, 302b, 302c, 302d and/or the gateway 304 can allow access to a home SSID, but block access to other SSID's transmitted via the one or more nodes 302a, 302b, 302c, 302d and/or the gateway 304. Such operation can ensure that the user device 303 is receiving the service that it had subscribed to and that traffic is segregated accordingly for optimal service. Such operation can be repeated for one or more devices associated with the one or more nodes 302a, 302b, 302c, 302d and/or the gateway 304. When the user device 303 connects to a network device that does not have the filter information (e.g., template) the user device 303 can access the service. As an example, inside a user premises, the user device 303 may be blocked from accessing a public Wi-Fi network, while outside the premises, the user device 303 can be permitted to access the public Wi-Fi network.

Figure 5:
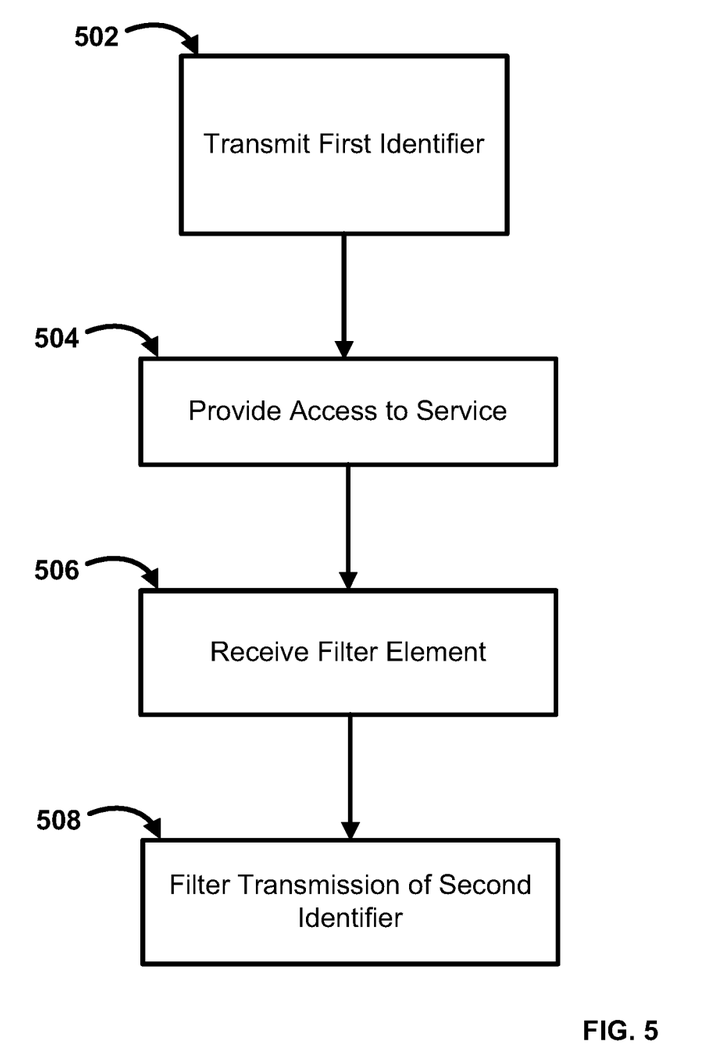
FIG. 5 is a flow chart of an exemplary method.

In an aspect, provided are methods for managing location information in a network. An exemplary method is shown in FIG. 5. In step 502, a first identifier can be transmitted (e.g., via broadcast). As an example, the first identifier can be associated with a first service, such as a broadband service, network connectivity, service set, etc. As a further example, the first identifier can be or comprise an SSID. In an aspect, the first service can relate to a private network (e.g., home network). In another aspect, the first service can relate to a public network. In a further aspect, a second identifier (e.g., SSID) can be transmitted with the first identifier.

In step 504, access to a service (e.g., the first service) can be provided using the first identifier. In an aspect, access can be provided to a user device. In another aspect, the first identifier can be used to configure a connection between a device, such as the user device and the first service. As an example, a wireless SSID can be transmitted and can be received by the user device to facilitate connection with a wireless network (e.g., the first service).

In step 506, a filter element can be received. In an aspect, the filter element (e.g., filter list template) can be associated with a user device. As an example, the filter element can be or comprise a MAC filter template. As a further example, the filter element can comprise an identifier (e.g., MAC address) associated with a user device. In another aspect, the filter element can comprise a list of identifiers (e.g., MAC addresses) and associated services to be provided and/or restricted based on the identifiers.

In step 508, transmission of a second identifier can be filtered using the filter element. In an aspect, the second identifier can be associated with a second service, such as a broadband service, network connectivity, service set, etc. As an example, the second identifier can be or comprise an SSID. In an aspect, the second service can relate to a private network (e.g., home network). In another aspect, the second service can relate to a public network. In yet a further aspect, filtering transmission inhibits access of the user device to the second service.

Figure 6:
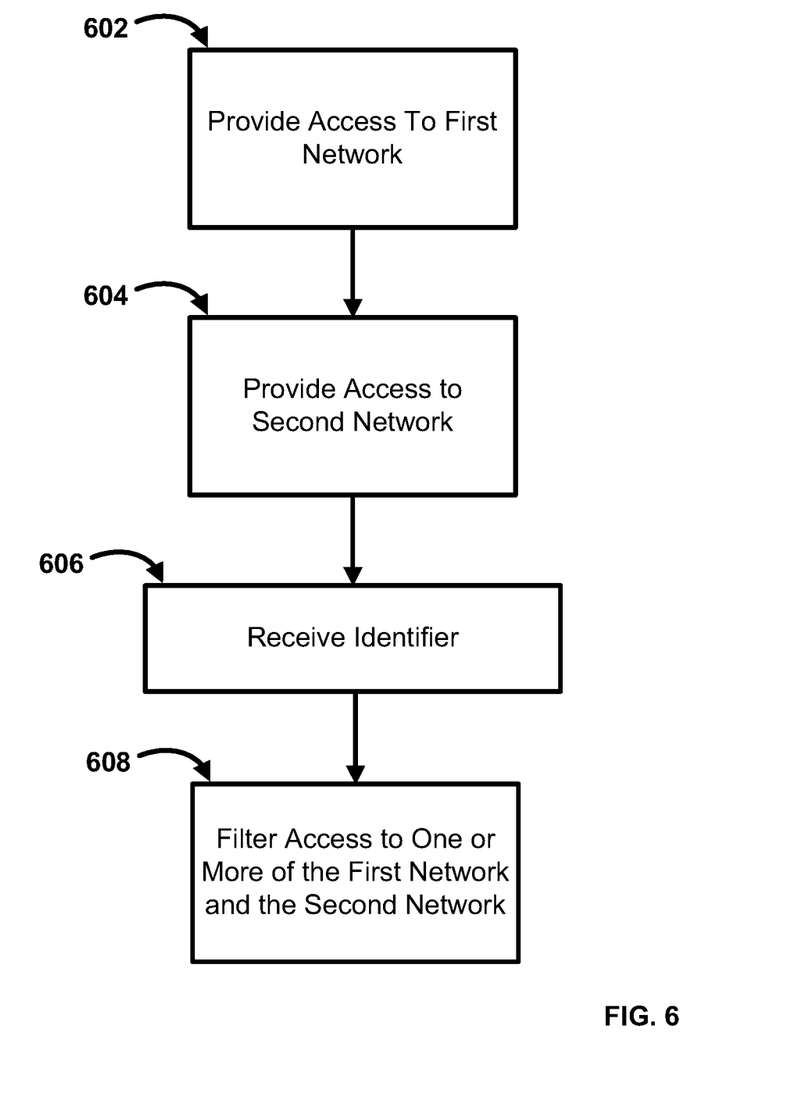
FIG. 6 is a flow chart of an exemplary method.

In an aspect, provided are methods for managing location information in a network. An exemplary method is shown in FIG. 6. In step 602, access to a first network can be provided. In an aspect, providing access to the first network can comprise transmitting (e.g., broadcasting) an identifier, such as an SSID. In another aspect, the first network can be a private network (e.g., home network). In a further aspect, the first network can be a public network.

In step 604, access to a second network can be provided. In an aspect, providing access to the second network can comprise transmitting (e.g., broadcasting) an identifier, such as an SSID. In another aspect, the second network can be a private network (e.g., home network). In a further aspect, the second network can be a public network.

In step 606, an identifier associated with a user device can be received. In an aspect, the identifier can be or comprise a MAC address. In an aspect, the identifier can be or comprise a MAC filter template. Other identifiers and information relating to the user device can be received.

In step 608, access by the user device to one or more of the first network and the second network can be filtered. As an example, access can be filtered using the identifier. In an aspect, filtering access can comprise filtering transmission of a network identifier (e.g., SSID) associated with one or more of the first network and the second network. In another aspect, filtering access of the user device can be dependent upon a location of the user device.

Figure 7:
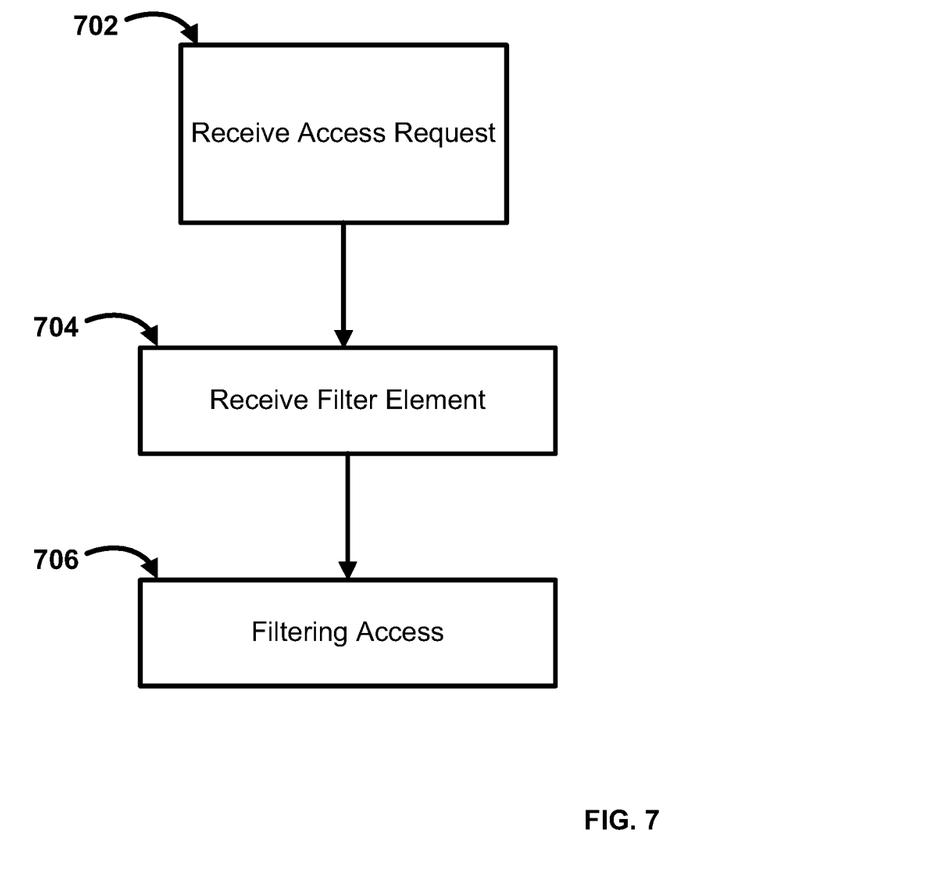
FIG. 7 is a flow chart of an exemplary method.

An exemplary method is shown in FIG. 7. In step 702, an access request can be received from a device, such as a user device. In an aspect, the access request can relate to a service, such as a broadband service, network connectivity, service set, etc. In another aspect, the requesting device can be associated with an identifier. As an example, the identifier can be or comprise a MAC address.

In step 704, a filter element can be received. In an aspect, the filter element can be associated with the requesting device. As an example, the filter element can be or comprise a MAC filter template. As a further example, the filter element can comprise an identifier (e.g., MAC address) associated with a user device.

In step 706, access by the user device to one or more services (e.g., network) can be filtered. As an example, access can be filtered using one or more of the filter element and the identifier associated with the requesting device. In an aspect, filtering access can comprise filtering transmission of a network identifier (e.g., SSID) associated with one or more networks. In another aspect, filtering access by the user device can be dependent upon a location of the user device.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

The invention claimed is:

1. A method comprising:
receiving, based on a first signal, a first service set identifier (SSID) from a network device, wherein the first SSID identifies a first network associated with the network device;
sending, based on the first SSID, an identifier of a user device to the network device;
receiving, based on an association between the user device and the network device, and based on access to the first network being prevented, a second SSID;
sending, based on the second SSID, first data to the network device; and
receiving, based on the first data and the second SSID, second data from the network device.

2. The method of claim 1, wherein the network device broadcasts one or more of the first SSID or the second SSID.

3. The method of claim 1, wherein: the first SSID is associated with a private network and the second SSID is associated with a public network, or the first SSID is associated with is a public network and the second SSID is associated with is a private network.

4. The method of claim 1, wherein the association between the user device and the network device is based on a media access control (MAC) address filter list, and wherein access to the first network is being prevented based on the MAC address filter list comprising the identifier of the user device.

5. The method of claim 1, wherein the first SSID and the second SSID are broadcast by the network device at a premise, and wherein the premise is associated with the user device.

6. An apparatus comprising:
one or more processors; and
memory storing processor-executable instructions that, when executed by the one or more processors, cause the apparatus to:
receive, based on a first signal, a first service set identifier (SSID) from a network device, wherein the first SSID identifies a first network associated with the network device;
send, based on the first SSID, an identifier of the apparatus to the network device;
receive, based on an association between the apparatus and the network device, and based on access to the first network being prevented, a second SSID;

send, based on the second SSID, first data to the network device; and receive, based on the first data and the second SSID, second data from the network device.

7. The apparatus of claim 6, wherein the network device broadcasts one or more of the first SSID or the second SSID.

8. The apparatus of claim 6, wherein: the first SSID is associated with a private network and the second SSID is associated with a public network, or the first SSID is associated with a public network and the second SSID is associated with a private network.

9. The apparatus of claim 6, wherein the association between the apparatus and the network device is based on a media access control (MAC) address filter list, and wherein access to the first network is being prevented based on the MAC address filter list comprising the identifier of the apparatus.

10. The apparatus of claim 6, wherein the first SSID and the second SSID are-broadcast by the network device at a premise, and wherein the premise is associated with the apparatus.

11. One or more non-transitory computer-readable media storing processor-executable instructions that, when executed by at least one processor of a computing device, cause the at least one processor to:

receive, based on a first signal, a first service set identifier (SSID) from a network device, wherein the first SSID identifies a first network associated with the network device;

send, based on the first SSID or the second SSID, an identifier of the computing device to the network device;

receive, based on an association between the computing device and the network device, and based on access to the first network being prevented, a second SSID;

send, based on the second SSID, first data to the network device; and receive, based on the first data and the second SSID, second data from the network device.

12. The one or more non-transitory computer-readable media of claim 11, wherein the network device broadcasts one or more of the first SSID or the second SSID.

13. The one or more non-transitory computer-readable media of claim 11, wherein: the first SSID is associated with a private network and the second SSID is associated with a private network, or the first SSID is associated with a public network and the second SSID is associated with a private network.

14. The one or more non-transitory computer-readable media of claim 11, wherein the association between the computing device and the network device is based on a media access control (MAC) address filter list, and wherein access to the first network is being prevented based on the MAC address filter list comprising the identifier of the computing device.

15. The one or more non-transitory computer-readable media of claim 11, wherein the first SSID and the second SSID are-broadcast by the network device at a premise, and wherein the premise is associated with the computing device.

16. A system comprising:
a user device configured to:

receive, based on a first signal, a first service set identifier (SSID) from a network device, wherein the first SSID identifies a first network associated with the network device;

send, based on the first SSID, an identifier of the user device to the network device;

receive, based on an association between the user device and the network device, and based on access to the first network being prevented, a second SSID;

send, based on the second SSID, first data to the network device; and receive, based on the first data and the second SSID, second data from the network device; and the network device configured to send the first SSID and the second SSID.

17. The system of claim 16, wherein the network device broadcasts one or more of the first SSID or the second SSID.

18. The system of claim 16, wherein the association between the user device and the network device is based on a media access control (MAC) address filter list, and wherein the network device is further configured to:

cause, based on the MAC address filter list comprising the identifier, the user device to be prevented from accessing the first network.

19. The system of claim 16, wherein: the first SSID is associated with a private network and the second SSID is associated with a public network, or the first SSID is associated with a public network and the second SSID is associated with a private network.

20. The system of claim 16, wherein the first SSID and the second SSID are broadcast by the network device at a premise and wherein the premise is associated with the user device.

* * * * *